United States Patent [19]

Smith et al.

[11] Patent Number: 4,632,314
[45] Date of Patent: Dec. 30, 1986

[54] ADHESIVE FOAM GENERATING NOZZLE

[75] Inventors: James C. Smith, Lorain; William R. Rehman, Vermilion, both of Ohio

[73] Assignee: Nordson Corporation, Amherst, Ohio

[21] Appl. No.: 741,451

[22] Filed: Jun. 5, 1985

Related U.S. Application Data

[63] Continuation-in-part of Ser. No. 436,012, Oct. 22, 1982, Pat. No. 4,533,701.

[51] Int. Cl.⁴ ............................................. B05B 7/04
[52] U.S. Cl. ...................................... 239/433; 239/8; 169/15; 261/DIG. 26
[58] Field of Search .............. 239/433, 434, 432, 426, 239/8, 87, 399; 169/11, 15; 261/DIG. 26

[56] References Cited

U.S. PATENT DOCUMENTS

| | | |
|---|---|---|
| 604,873 | 5/1898 | Bean . |
| 2,865,675 | 12/1958 | Roosa ................................. 239/87 |
| 2,955,764 | 10/1960 | Hruby, Jr. .......................... 239/206 |
| 3,051,397 | 8/1962 | Hanson .............................. 239/432 |
| 3,556,411 | 1/1971 | Nord et al. ........................ 239/581 |
| 3,633,795 | 1/1972 | Brooks ............................... 222/134 |
| 3,701,482 | 10/1972 | Sachnik ............................ 239/590.3 |
| 3,764,069 | 10/1973 | Runstadler, Jr. et al. ......... 239/434 |
| 3,784,111 | 1/1974 | Piggott ............................. 239/427.3 |
| 3,836,076 | 9/1974 | Conrad et al. ...................... 239/8 |
| 3,946,947 | 3/1976 | Schneider ......................... 239/401 |
| 4,059,714 | 11/1977 | Scholl et al. ...................... 428/310 |
| 4,103,876 | 8/1978 | Hasselman, Jr. et al. ......... 366/178 |
| 4,247,581 | 1/1981 | Cobbs, Jr. et al. ............... 427/373 |
| 4,330,086 | 5/1982 | Nysted ................................ 239/8 |
| 4,350,298 | 9/1982 | Tada ................................. 239/333 |
| 4,474,680 | 10/1984 | Kroll .................................. 239/8 |

FOREIGN PATENT DOCUMENTS

7924574 8/1979 Fed. Rep. of Germany .
2081606 2/1982 United Kingdom .

OTHER PUBLICATIONS

Disclosure by Inventor of Prior Art Hot Melt Foamed Adhesive Nozzle Assembly sold by the Assignee.

Primary Examiner—Joseph F. Peters, Jr.
Assistant Examiner—Scott Malpede
Attorney, Agent, or Firm—Wood, Herron & Evans

[57] ABSTRACT

A nozzle assembly adapted with an adhesive spray gun for forming a liquid adhesive/gas solution into a foam includes a nozzle formed with a chamber having a rearward end and a forward discharge orifice which is maintained at a pressure less than that required to maintain the gas in solution in the liquid. A turbulence plate having a front surface formed with a notch is mounted to the spray gun such that the notch extends within the rearward end of the chamber. The notch is formed with at least two input ends and a turbulence zone therebetween. The liquid/gas solution is conveyed to each input end of the notch where a separate stream of solution is formed. The streams move along the notch from each input end toward the turbulence zone of the notch where they impact one another within the chamber. Agitation of the liquid/gas solution caused by impacting of the separate streams, in the presence of the reduced pressure within the chamber, results in the partial or initial formation of a homogeneous, closed cell solid foam within the chamber prior to emission from the discharge orifice.

20 Claims, 7 Drawing Figures

ADHESIVE FOAM GENERATING NOZZLE

RELATED CASES

This application is a continuation in part of U.S. application Ser. No. 436,012, filed Oct. 22, 1982 now U.S. Pat. No. 4,533,701 and entitled "Foam Generating Nozzle", which is assigned to the same assignee as this invention.

BACKGROUND OF THE INVENTION

This invention relates generally to applicators for hot melt thermoplastic adhesives, and, more particularly, to a nozzle capable of dispensing hot melt adhesive in the form of a cellular foam.

Hot melt thermoplastic adhesives or so-called "hot melts" are widely used for adhering many diverse products. One of the most common applications of such adhesives is for packaging and cartoning where the quick setting time of hot melts is particularly advantageous.

Among the most common problems with hot melt adhesives are those of spreading the adhesive over the desired surface area and then compressing the adhesive after application so as to obtain sufficient surface contact between the adhesive and adhered substrate to achieve a good bond. The relatively high viscosity, high surface tension and quick setting time of hot melt adhesives can combine to prevent the adhesive from spreading over a large surface area when the adhesive is applied as a liquid to the substrate. Instead of spreading, the liquid adhesive sets up as a thick bead on the substrate. Even when quickly compressed, as for example between two flaps of a carton, the liquid adhesive is sometimes difficult to spread. It has been found that when two surfaces which have been adhered by liquid hot melt adhesive are pulled apart, the bond can break between the adhesive-substrate interface. Consequently, in order to achieve a good bond it is desirable to provide a large area of surface contact between the adhered parts.

As discussed in U.S. Pat. No. 4,059,714 to Scholl et al, which is assigned to the same assignee as this invention, improvements in spreadability and bonding strength are achieved with a given quantity of selected hot melt adhesive if the adhesive is applied as a cellular foam to the substrate rather than as a conventional non-foamed, liquid adhesive. The method of producing foam adhesive disclosed in Scholl et al involves the injection of air or a gas such as nitrogen into the liquid adhesive under high pressure in the range of 300 pounds per square inch. When the liquid adhesive/gas solution is subsequently dispensed into atmospheric pressure, the gas evolves from the solution in the form of small bubbles which become entrapped in the surrounding adhesive and cause it to expand volumetrically to form a homogeneous, closed cell, solid adhesive foam.

In the alternative, a similar foam may be formed as disclosed in U.S. Pat. No. 4,247,581 to Cobbs, Jr. et al, which is assigned to the same assignee as this invention. In the Cobbs method, a so-called blowing agent is placed into solution with the liquid adhesive under appropriate temperature and pressure conditions. When the solution is exposed to a pressure less than that required to maintain the blowing agent in solution, gas bubbles are produced and become entrapped in the liquid forming essentially the same type of closed cell solid adhesive foam as in the Scholl et al method.

Regardless of the manner in which closed cell, solid adhesive foam is produced, several advantages are provided as compared to conventional liquid hot melt adhesive. Foamed adhesive is much easier to spread along a substrate than unfoamed hot melt adhesive, which is attributable to the surface characteristics of foamed adhesive. In contrast to the viscous liquid adhesive, foamed adhesive is much less viscous allowing a greater volume of foamed adhesive in the molten state to be moved or flattened by a given force per unit of time than may be moved or flattened by the same force acting upon the same molten adhesive in an unfoamed state. In addition, whereas liquid adhesives are incompressible, foamed adhesives are compressible because of the presence of gas bubbles in the adhesive and thus easier to spread.

It has also been found that foamed adhesives have a longer "open" time during which they retain their bonding strength after being dispensed onto a substrate. Foamed adhesives also have proved to set up and adhere faster when compressed between two substrates, as for example two flaps of a carton. These two characteristics together are very desirable in cartoning applications because they eliminate the need to instantly close flaps after application of the adhesive and also permit the adhered surfaces to be released from clamping pressure after a short period of time.

The improved spreadability, bonding strength and rapid set up time of foamed adhesives, as compared to liquid hot melt adhesives, are achieved by the formation of a homogeneous solid foam having small, regularly spaced air or gas pockets throughout the adhesive. Problems arise with the formation of foamed adhesive having non-uniform gas bubbles including large bubbles which are not in solution in the adhesive. Large bubbles produce randomly spaced voids in the adhesive accompanied by small amounts of foamed adhesive in separate droplets. Such non-uniform foamed adhesive tends to sputter and spit when ejected from the foam producing system creating an uneven deposit of adhesive material on the substrate. Adhesive foam having non-uniform gas or air bubbles also becomes unstable more quickly and thus does not retain its bonding strength as long as desired after being dispensed onto a substrate. Poor foam quality and foam stability are particular problems in many prior adhesive foam guns when they are operated through an on/off/on cycle. In addition, many adhesive foam guns fail to provide foam instantaneously when cycled from off to on.

SUMMARY OF THE INVENTION

It is therefore among the objects of this invention to provide an apparatus for producing adhesive foam from a liquid adhesive having gas maintained under pressure in solution in the liquid, which produces foam with good stability and good foam life, which generates foam immediately when cycled from off to on and which forms an adhesive foam with small, regularly spaced air or gas pockets throughout the adhesive.

These objectives are accomplished in a presently preferred embodiment of the nozzle assembly of this invention wherein liquid/gas solution is conveyed under pressure to a turbulence zone in the nozzle assembly. The liquid/gas solution is separated into two or more streams moving in opposite directions which are impacted with one another in the turbulence zone wherein the flow of the liquid/gas solution is agitated, disrupted or otherwise substantially disturbed. The agitated liquid/gas solution enters an area maintained at a pressure less than that required to maintain the gas in solution in the liquid, where the gas at least partially evolves from the solution in the form of small bubbles which become entrapped in the surrounding liquid to form a foam. The foam is then discharged from the nozzle assembly through an exit orifice.

More specifically, the nozzle assembly of this invention is adapted to be mounted to an adhesive gun such as shown, for example, in U.S. Pat. No. Re 27,865 to Baker et al, which is assigned to the same assignee as this invention. In one embodiment, the nozzle assembly includes a nozzle, such as a carbide nozzle tip, which is formed with a foaming chamber having a rearward end and a forward end terminating with a discharge orifice. The foaming chamber has a pressure which is lower than the pressure required to maintain the gas in solution in the liquid.

The nozzle tip is welded or brazed to a nozzle holder which is mounted by a nozzle retaining nut onto the barrel block of the gun. The rearward portion of the nozzle holder is adapted to mount a plate holder having at least two axial passageways. A turbulence plate is mounted at the forward end of the plate holder, which includes a front surface disposed within the rearward end of the chamber in the nozzle tip. The front surface of the turbulence plate is formed with a channel or notch having opposed input ends adjacent the axial passageways in the plate holder. In one presently preferred embodiment, the front surface of the turbulence zone is substantially planar. The notch is divided into essentially three areas or segments including a central turbulence zone and two separate inlet passages, each of which extends from one of the input ends of the notch to the turbulence zone. In a presently preferred embodiment, the turbulence zone is a space between the two inlet passages. The inlet passages are formed in the forward surface of the turbulence plate in direct alignment with one another, or, alternatively, parallel but offset with one another. It is also contemplated that the notch could be formed as a continuous channel with the turbulence zone being formed at or near the center of the channel between its input ends.

Liquid adhesive/gas solution is directed under high pressure through the axial passageways to the input ends of the notch, and into each of the inlet passages formed by the notch. The inlet passages each direct a separate stream of liquid/gas solution to the turbulence zone of the notch where the streams collide with one another within the rearward end of the foaming chamber. The turbulence and agitation of the colliding liquid adhesive streams, in the presence of the reduced pressure within the foaming chamber, causes the gas within the liquid adhesive to at least partially leave the solution and initially form a homogeneous, closed cell solid adhesive foam having small regularly spaced gas bubbles in the adhesive. The at least partially formed foam is then ejected from the discharge orifice of the chamber in the nozzle tip for application to a substrate. It should be understood that for purposes of discussing this invention, the term "turbulence" is intended to refer to an agitation, disruption or other violent disturbance of the adhesive flow, particularly when separate streams of adhesive are made to collide with one another at the turbulence zone within the chamber.

In an alternative embodiment, the nozzle assembly is formed with a hollow nozzle holder having an open rearward end and a forward end terminating in a discharge orifice. An insert is threaded within the rearward end of the nozzle holder and includes a cylindrical body formed with at least two flats which are spaced from the interior wall of the nozzle holder forming axial passageways therebetween. A turbulence plate is mounted to the forward end of the insert which is generally frusto-conical having a conicalshaped skirt tapering radially inwardly to a planar end surface. A foaming chamber is formed within the nozzle holder between the end surface of the insert and the discharge orifice.

A notch is formed in the turbulence plate which includes two input passages extending along the conical skirt and at least a portion of the planar end surface, and a turbulence zone into which the inlet passage discharge. The input passages each communicate with an axial passageway to receive liquid adhesive/gas solution which is separated by the input passages into two separate streams and discharged into the turbulence zone for at least partial foaming in the same manner as described above in the other embodiment of the nozzle assembly herein.

An important aspect of the nozzle assemblies of this invention is the provision of a lower resistance to fluid flow at the discharge orifice than along both of the input passageways, combined, which lead to the turbulence zone. It has been found that the flow resistance of the discharge orifice relative to input passageways must be adjusted to create at least some back pressure within the foaming chamber. The back pressure in the foaming chamber directly affects the foaming characteristics of the nozzle. If the back pressure is too large, production of foam from the nozzle deteriorates. Poor foam quality results from a back pressure in the chamber which is too low.

Many variables affect the flow resistance at the discharge orifice and input passageways, such as their cross-section, configuration, length, surface finish and the type of fluid material flowing therethrough. In addition, the flow resistance in the input passageways leading to the turbulence zone must be adjusted to obtain the required velocity of the fluid streams. The input passageways must be small enough in cross-section to provide the fluid streams with sufficient velocity to cause severe turbulence and agitation of the streams when they collide.

Considering the variables affecting flow resistance, and the velocity requirements of the colliding fluid streams, it has been determined experimentally that the combined flow resistance of the input passageways should be in the range of about 1.1 to 10, and optimally in the range of about 1.4 to 5, times greater than the flow resistance of the discharge orifice. These ratios were determined experimentally by measuring the combined cross-sectional areas of the input passageways, and the cross-sectional area of the discharge orifice. It is contemplated, however, that the relative flow resistance could also be compared by measuring other terms, such as the fluid velocity along the input passageways and discharge orifice. If the flow resistance of the input passages is maintained about 1.1 to 10 times greater than the flow resistance of the discharge orifice, an appropriate back pressure is created in the foaming chamber which is less than that required to maintain the gas in solution in the liquid so as to allow the gas to at least begin to leave solution and partially form a foam within the chamber in the nozzle tip.

In order to turn the flow of foamed adhesive on and off in one embodiment of this invention, the plate holder and turbulence plate are formed with aligning axial bores which are adapted to receive a retractable plunger. The plunger is formed with an end portion which, in the extended position, engages the rearward end of the chamber to seal the inlet passages and prevent flow of fluid adhesive within the chamber of the nozzle tip. Upon retraction of the plunger, the inlet passages are no longer blocked and introduce the liquid adhesive directly into the nozzle tip chamber for foaming.

DESCRIPTION OF THE DRAWINGS

The structure, operation and advantages of this invention will become apparent upon consideration of the following description taken in conjunction with the accompanying drawings wherein.

DETAILED DESCRIPTION OF THE INVENTION

Figure 1:
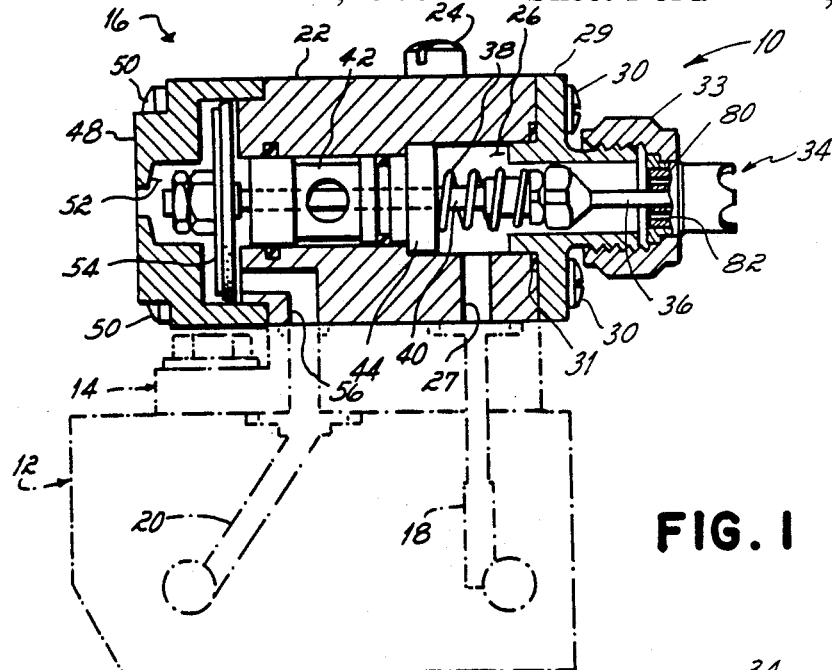
FIG. 1 is a front view in partial cross-section of one embodiment of an adhesive gun incorporating the nozzle assembly of this invention.

Referring now to FIG. 1, a gun 10 is illustrated which is essentially the same as that disclosed in U.S. Pat. No. Re 27,865 to Baker et al, which is assigned to the same assignee as the instant invention. The structure and operation of gun 10 is only partially discussed herein, and reference should be made to U.S. Pat. No. Re 27,865 for a detailed description of gun 10 which is expressly incorporated by reference in its entirety herein.

The gun 10 includes a service block module 12 adjustably connected to an adapter 14 upon which is mounted a gun module 16. Intersecting passages are drilled in the forward portion of the service block module 12 and adapter 14 to form a molten adhesive supply passage 18. An air supply passage 20 is formed by holes drilled in the rearward portion of service block module 12 and adapter 14.

The gun module 16 includes a barrel block 22 which is bolted by machine screws 24 to the adapter 14. Barrel block 22 is formed with an axially extending central barrel 26 leading to a nozzle plate 29 which is bolted to the forward end of barrel block 22 by machine screws 30 and sealed thereagainst with an O-ring 31. An adhesive passage 27 is formed in barrel block 22 which connects the molten adhesive supply passage 18 with the central barrel 26. The forward end of nozzle plate 29 is formed with external threads adapted to engage the internal threads of a nozzle retaining nut 33. The nozzle assembly 34 of this invention is mounted to the barrel block 22 by the nozzle retaining nut 33, as described in more detail below.

Movable within the central barrel 26 is a reciprocating valve element or plunger 36 which is biased forwardly toward the nozzle assembly 34 by a helical spring 38. The plunger 36 is secured to the end of an operating rod or piston 40 which extends axially through the central barrel 26 and then through a sleeve 42 snugly received in the rearward portion of the central barrel 26. The sleeve 42 has a radial flange 44 at its forward end which rests against a shoulder 46 formed in the central barrel 26. The sleeve 42 serves as a bearing element for the helical spring 38 so that the spring tension urges the plunger 36 to a forward or closed position.

The rearward end of barrel block 22 is closed by a end cap 48 fastened in place by machine screws 50. The end cap 48 is formed with a recess so that when mounted upon barrel block 22 a piston chamber 52 is defined therebetween within which a fluid piston 54 reciprocates axially in response to the pressure of operating air. Operating air is transmitted to the piston chamber 52 through a passage 56 formed in gun module 16 and connected to the air supply passage 20 formed in service block module 12 and adapter 14. The air passage 56 admits air to the forward side of fluid piston 54 tending to force it rearwardly within piston chamber 52, which, in turn, pulls the piston 40 and plunger 36 rearwardly. This permits molten adhesive to flow through the adhesive supply passage 18, into the adhesive passage 27 formed in the barrel block 22, along the central barrel 26 of gun module 16 and then into the nozzle assembly 34 as described below.

The embodiments of the nozzle assembly of this invention are adapted to mount to the gun module 16 and convert a liquid hot melt adhesive supplied through central barrel 26 to a homogeneous, closed cell adhesive foam. The liquid adhesive is of the general type disclosed in U.S. Pat. No. 4,059,714 to Scholl et al in which air or gas such as nitrogen is thoroughly mixed with liquid hot melt adhesive and then forced into solution with the liquid adhesive by high pressure. Alternatively, liquid adhesive of the type disclosed in U.S. Pat. No. 4,247,581 to Cobbs, Jr. et al may be utilized herein.

Figure 2:
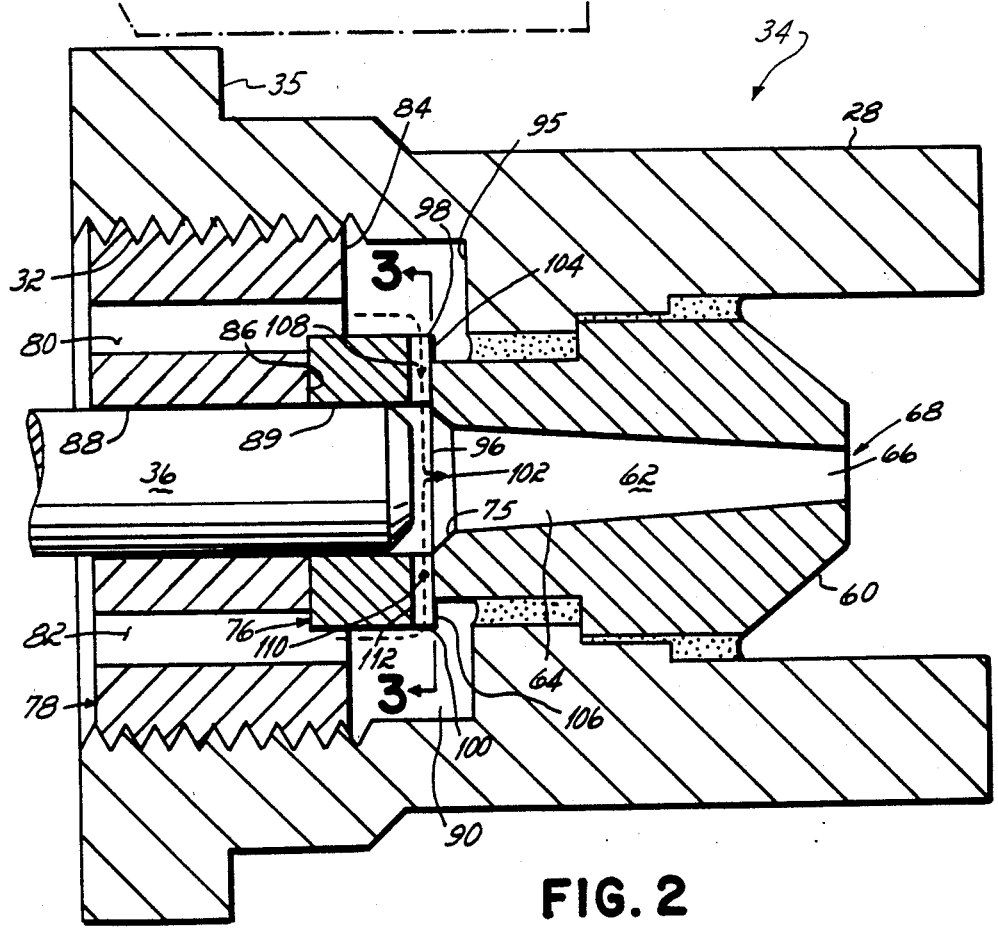
FIG. 2 is a side elevational view in partial cross-section of the embodiment of the nozzle assembly herein shown in FIG. 1.

Referring now to FIG. 2, one embodiment of a nozzle assembly 34 according to this invention includes a nozzle, such as a carbide nozzle tip 60, which is welded or brazed to the forward portion of a nozzle holder 28. The rearward portion of nozzle holder 28 is formed with an axial bore 32 which communicates with the central barrel 26. The nozzle tip 60 is formed with a foaming chamber 62 which decreases in cross-sectional area from its rearward end 64 to its forward end 66. A discharge orifice 68 is formed at the forward end 66 of foaming chamber 62 which is in the form of a generally circular opening. The rearward end 64 of foaming chamber 62 is formed with an annular shoulder 75 which tapers radially outwardly.

Referring to the embodiments of this invention shown in FIGS. 1–3a, the nozzle assembly 34 also includes a turbulence plate 76 which is mounted by a plate holder 78 within the axial bore 32 formed in the rearward portion of nozzle holder 28. The plate holder 78 is formed with external threads adapted to mate with internal threads formed in the nozzle holder 28 within its axial bore 32 so as to mount the plate holder 78 to the nozzle holder 2. The nozzle holder 28 includes a flange 35 at its rearward end which mates with the nozzle retaining nut 33 for mounting the nozzle assembly 34 to the nozzle plate 29 and barrel block 22.

A pair of axial passageways 80, 82 are drilled in plate holder 78 and spaced approximately 180° apart. The forward end 84 of plate holder 78 is formed with a recess 86 which is adapted to receive the turbulence plate 76. The turbulence plate 76 is welded or brazed to the plate holder 78 within the recess 86 and at least partially covers both of the axial passageways 80, 82. In one presently preferred embodiment of this invention, an axial throughbore 88 is formed in the plate holder 78 and an aligning throughbore 89 is formed in turbulence plate 76, which are adapted to receive the retractable plunger 36. When biased forwardly by helical spring 38, the plunger 36 seats against the annual shoulder 75 formed at the rearward end 64 of foaming chamber 62.

In the embodiments of this invention shown in FIGS. 1–3a, the turbulence plate 76 includes a substantially planar forward face or surface 94 which is disposed at the rearward end 64 of foaming chamber 62. A channel or notch 96, formed in a V-shape for ease of manufacture, extends transversely along the planar forward surface 94 of turbulence plate 76 between opposed input ends 98, 100. In one embodiment shown in FIGS. 2 and 3, the notch 96 is divided into three sections or segments including a central turbulence zone 102 and two inlet passages 104, 106. The inlet passages 104, 106 extend from the input ends 98, 100, respectively, of notch 96, to the turbulence zone 102. The turbulence zone 102 is essentially a space between the inlet passages 104, 106 which is formed by the throughbore 89 in turbulence plate 76.

Liquid adhesive/gas solution flows under high pressure from the central barrel 26 in barrel block 22 into each of the axial passageways 80, 82 in the plate holder 78. The liquid adhesive/gas solution exits the axial passageways 80, 82 and enters an annular space or cavity 90 formed between the forward end 84 of the plate holder 78 and the front face or surface 95 at which the axial bore 32 in nozzle holder 28 terminates. The input ends 98, 100 of the notch 96 formed in turbulence plate 76 terminate at the cavity 90 so that the liquid/gas solution is introduced into each of the inlet passages 104, 106 from the cavity 90. Each inlet passage 104, 106 directs a separate stream 108, 110 of liquid/gas solution, respectively, from their input ends 98, 100 to the turbulence zone 102 of the notch 96. The separate streams 108, 110 impact with one another at the turbulence zone 102 which is disposed within the foaming chamber 62 in the nozzle tip 60. For purposes of the present discussion, the term "turbulence" is used herein in reference to an agitation, disruption or other violent disturbance of the adhesive fluid flow when the separate streams 108, 110 impact with one another within foaming chamber 62.

Figure 3:
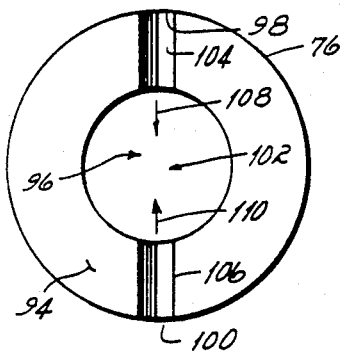
FIG. 3 is a cross-sectional view of the notch in the forward surface of the turbulence plate herein taken generally along line 3—3 of FIG. 2.
Figure 3A:
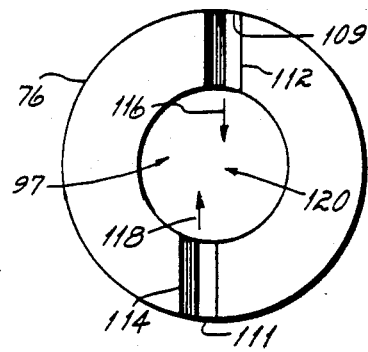
FIG. 3a is an alternative embodiment of the notch shown in FIG. 3.

In one embodiment, shown in FIG. 3, the inlet passages 104, 106 directly align with one another so as to impact one stream 108 of liquid/gas solution directly into the other stream 110. Alternatively, as illustrated in FIG. 3a, a notch 97 is formed in turbulence plate 76 whose inlet passages 112, 114 extend from input ends 109, 111, respectively, and are parallel but slightly offset from one another. The inlet passages 112, 114 formed by notch 97 therefore direct streams 116, 118 of liquid/gas solution into one another but offset sufficiently to create a swirling motion of the liquid/gas solution at the turbulence zone 120 of notch 97 within the rearward end 64 of chamber 62.

The operation of nozzle assembly 34 and gun 10 in the production of a homogeneous closed cell adhesive foam is as follows. Liquid adhesive/gas solution flows through the adhesive supply passages 18, 27 and into the central barrel 26 formed in the barrel block 22. The adhesive/gas solution then flows from the central barrel 26 into the axial passageways 80, 82 formed in the plate holder 78. Although some agitation of the adhesive/gas solution occurs within cavity 90, no foaming occurs because the solution is still under a pressure sufficient to maintain the gas in solution in the liquid and the liquid/gas solution moves relatively slowly along the large diameter passages 80, 82. With the plunger 36 retracted, the liquid/gas solution flows in two separate jets or streams 108, 110 through the inlet passages 104, 106, respectively, and into the turbulence zone 102 formed by the notch 96. The streams 108, 110 impact against one another at the turbulence zone 102 which is disposed within the rearward end 64 of foaming chamber 62.

The liquid/gas solution is maintained under pressure throughout its movement through the gun module 16 to the foaming chamber 62. Upon reaching the foaming chamber 62, the separate streams 108, 110 are exposed to a pressure within the foaming chamber 62 which is lower than that required to maintain all of the gas in solution in the liquid. Due to the initial agitation of the liquid/gas solution within the cavity 90, and the turbulence created by impacting the two streams 108, 110 together in the presence of the reduced pressure within foaming chamber 62, the gas begins to leave solution to at least partially form a homogeneous closed cell adhesive foam prior to emission from the discharge orifice 68. Agitation of the liquid adhesive within the cavity 90, and along the notch 96 in the presence of the reduced pressure in chamber 62, results in the formation of good quality and stable foam essentially instantaneously when the spray gun 10 is cycled from off to on by retracting plunger 36.

Figure 4:
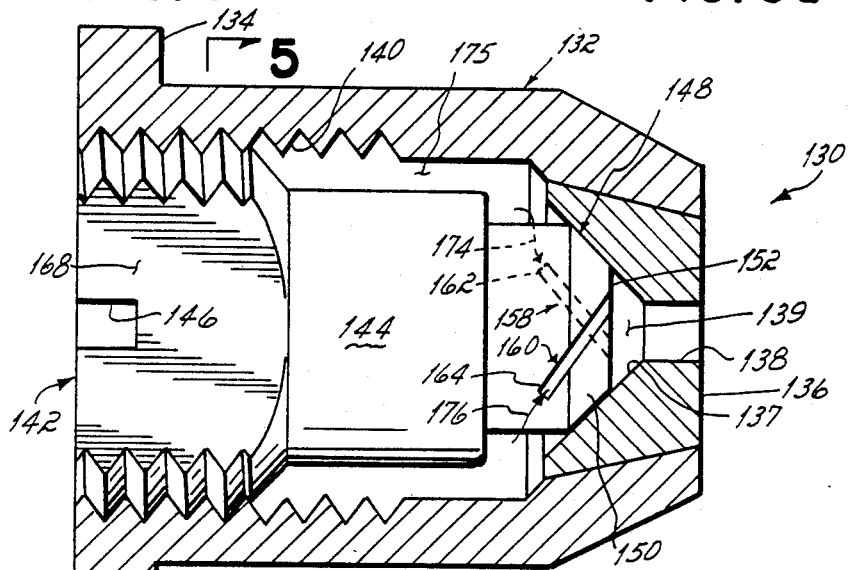
FIG. 4 is a side elevational view in partial cross-section of an alternative embodiment of the nozzle assembly of this invention.
Figure 5:
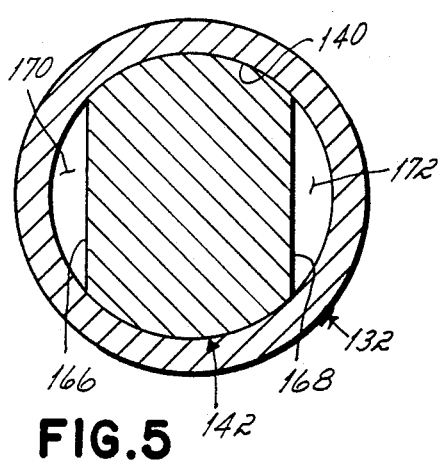
FIG. 5 is a cross-sectional view taken generally along lines 5—5 of FIG. 4.

Referring now to FIGS. 4 and 5, an alternative embodiment of the nozzle assembly herein is illustrated. In this embodiment, nozzle assembly 130 includes a hollow nozzle holder 132 having a rearward end formed with a flange 134 adapted to engage the nozzle retaining nut 33 to support the nozzle assembly 130 upon the nozzle plate 29. The nozzle holder 132 tapers radially inwardly from its rearward end toward its open, forward end which mounts a nozzle tip 136 having a discharge orifice 138.

The interior wall 140 of nozzle holder 132 is threaded to engage the external threads of an insert 142 having a cylindrical body 144 formed with a notch 146 at its rearward end to receive a screwdriver blade. Mounted to the forward end of insert 142 is a turbulence plate 148, made of a hardened material such as carbide. The forward end of turbulence plate 148 is frusto-conical in shape having a conical-shaped skirt 150 tapering radially inwardly to a generally planar forwardmost surface 152. The conical skirt 150 seats against the conical sidewall 137 of nozzle tip 136 forming a foaming chamber 139 between the planar surface 152 of insert 142 and the discharge orifice 138 in nozzle tip 136. A notch is formed in the forward end of plug 142 at the rearward portion of foaming chamber 139 which comprises a turbulence zone 156 at the planar surface 152, and opposed arcuate inlet passages 158, 160, having input ends 162, 164, respectively, which extend across the conical-shaped skirt 150 and at least partially along the planar surface 152. See FIG. 6.

The rearward portion of insert 142 is formed with opposed flats 166, 168 spaced approximately 180° apart on the exterior surface of the cylindrical body 144. The remainder of cylindrical body 144 is threaded to engage the threads in the interior wall 140 of nozzle holder 132 to secure the insert 142 therewithin. The flats 166, 168 are spaced from the interior wall 140 of nozzle holder 132 forming axial passageways 170, 172, respectively, therebetween. The axial passageways 170, 172 lead to an annular passageway 175 which communicates with the input ends 162, 164 of inlet passageways 158, 160 for carrying the adhesive liquid/gas solution, under pressure, thereto.

The nozzle assembly 130 functions in essentially the same manner as nozzle assembly 34 described above. Liquid adhesive/gas solution flows through the adhesive supply passages 18, 27 into the central barrel 26, to the axial passageways 170, 172 and then into the annular passageway 175. The liquid adhesive/gas solution is divided into two fluid streams 174, 176 at the input ends 162, 164 of inlet passages 158, 160. The fluid streams 174, 176 then flow along the inlet passages 158, 160 and violently collide at the turbulence zone 156. Because the forward end of the turbulence plate 148 is frusto-conical in shape, the inlet passages 158, 160 are arcuate in configuration and extend along a radially inwardly tapering skirt 150 to the turbulence zone 156. The shape of inlet passageways 158, 160 creates a swirling motion in the fluid streams 174, 176 which further agitates them at the rearward portion of foaming chamber 139.

The liquid/gas solution is maintained under pressure throughout its movement to the foaming chamber 139. At the foaming chamber 139, the severe agitation of the liquid/gas solution in the presence of reduced pressure, induces the gas to at least partially leave solution for the initial formation of foam before exiting the discharge orifice 138.

An important factor in the production of adhesive foam having good quality and stability, in both of the nozzle assemblies 34, 130 disclosed herein, is the maintenance of a proper relationship of flow resistance between the inlet passageways and the discharge opening. As used herein, the term "flow resistance" refers to the resistance of movement of fluid through the inlet passageways and discharge orifice of the nozzle assemblies 34, 130. Many variables affect the flow resistance at the discharge orifice and input passageways, such as their cross-section, configuration, length, surface finish and the viscosity of fluid material flowing therethrough. In addition, the flow resistance in the input passageways leading to the turbulence zone must be adjusted according to the velocity requirements of the fluid streams. That is, the input passageways must be small enough in cross-section to provide the fluid streams with sufficient velocity to cause severe turbulence and agitation of the streams when they collide at the turbulence zone to induce at least partial foaming within the foaming chamber.

It has been found that lower resistance to fluid flow must be maintained at the discharge orifice than along both of the input passageways, combined, which lead to the turbulence zone. The flow resistance in the discharge orifice relative to the input passageways must be adjusted to create at least some back pressure within the foaming chamber which is greater than atmospheric or ambient, but less than the pressure required to maintain the gas in solution in the liquid. The back pressure in the foaming chamber directly affects the foaming characteristics of the nozzle assemblies 34, 130. If the back pressure in the foaming chamber is too large, production of foam from the nozzle deteriorates. Poor foam quality results from the back pressure in the chamber which is too low. Considering the variables affecting flow resistance in the input passageways and discharge opening, and the velocity requirements of the colliding fluid streams at the turbulence zone, it has been determined that the combined flow resistance of the input passageways should be in the range of about 1.1 to 10, and optimally in the range of about 1.4 to 5, times greater than the flow resistance of the discharge orifice.

These ratios have been determined experimentally by measuring the combined cross-sectional areas of the input passageways, and the cross-sectional area of the discharge orifice. For example, in the embodiment of this invention shown in FIGS. 1–3a, adhesive foam having good quality and stability is produced with a discharge orifice 68 having a diameter of 0.025 inches and a cross-sectional area of 0.000491 square inches. The notch 96 in turbulence plate 76 is formed with a top dimension of 0.017 inch, a depth dimension of 0.013 inch and a flat bottom having a width of 0.005 inch. Each inlet passage 104, 106 has a cross-sectional area of 0.000143 square inches for a combined cross-sectional area of 0.000286 square inches. The combined cross-sectional area of the inlet passages 104, 106 is therefore about 1.72 times smaller than the cross sectional area of the discharge orifice 68 resulting in a flow resistance in the inlet passages 104, 106 which is approximately 1.72 times greater than the flow resistance of the discharge orifice 68. Using Eastman A3 adhesive and carbon dioxide to form the liquid/adhesive gas solution, at a gun 10 operating pressure of about 500–520 p.s.i., it has been found that the relative dimensions of the discharge orifice 68 and inlet passages 104, 106 listed above result in a back pressure within foaming chamber 62 and the formation of adhesive foam having good quality and good stability.

Figure 6:
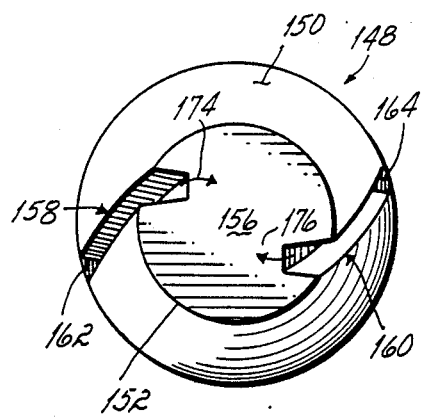
FIG. 6 is an end view of the turbulence plate in the nozzle assembly of FIG. 4.

In the embodiment of this invention shown in FIGS. 4–6, adhesive foam having good quality and stability is produced with a discharge opening 138 having a diameter of 0.060 inches and a cross-sectional area of 0.002826 square inches. Each of the inlet passages 158, 160 in turbulence plate 148 is formed with a depth dimension of 0.020 inches and a width dimension of 0.030 inches for a combined cross-sectional area of 0.0012 square inches. Therefore, the combined cross-sectional area of the inlet passages 158, 160 is about 2.35 times smaller than the cross-sectional area of the discharge orifice 138, which results in a flow resistance in the inlet passages 159, 160 about 2.35 times greater than that of the discharge orifice 138. Using Eastman A3 adhesive and carbon dioxide to form the liquid/adhesive gas solution, at a gun 10 operating pressure of about 500–520 p.s.i., it has been found that the relative dimensions of the discharge orifice 138 and inlet passages 158, 160 listed above result in a back pressure within foaming chamber 139 which assures the formation of adhesive foam having good quality and good stability.

It is contemplated that the relative flow resistances of the input passages and discharge orifice could also be compared by measuring other parameters, however, at this time, flow resistance has been measured in terms of the relative cross-sectional areas of the input passages and discharge orifice. If the flow resistances measured by comparing relative cross-sectional areas are maintained within the 1.1 to 10 range, an appropriate back pressure is created in the foaming chamber which is less than that required to maintain the gas in solution in the liquid so as to allow the gas to at least begin to leave solution and partially form a foam within the foaming chamber in the nozzle tip.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, in the embodiment shown in FIGS. 1–3a, it is contemplated that the plunger 36 may be eliminated from the gun module 16 and the turbulence plate 76 formed without a bore 89. In such an embodiment, the notch or channel formed in the forward surface of turbulence plate 76 is continuous, forming opposed inlet passages with a turbulence zone therebetween at or near the middle of the notch. In such embodiment, the flow of adhesive through the gun module 16 and into the nozzle assembly 34 is continuous and is stopped by shutting off the adhesive flow at the source or at another location with the spray gun.

In addition, it is contemplated that the nozzle assembly 34 of this invention could be adapted for use with a gun other than the gun described, for example the spray gun disclosed in U.S. Pat. No. 4,241,880, which is assigned to the same assignee as the present invention. The spray gun disclosed in that patent provides the additional feature of atomizing the adhesive foam as it is ejected from the discharge orifice 68 to spray a thin adhesive coating onto a substrate.

It is further contemplated that the foaming chamber 62 in nozzle tip 60 could be eliminated and replaced with a fluid conduit extending between the turbulence zone 102 and an exit opening formed in the nozzle assembly 34. In that embodiment, the fluid conduit is maintained at a pressure less than that required to maintain the gas in solution in the liquid.

Therefore, it is intended that the invention not be limited to the particular embodiment disclosed as the best mode contemplated for carrying out this invention, but that the invention will include all embodiments falling within the scope of the appended claims.

What is claimed is:

1. A nozzle assembly for forming a liquid/gas solution into a foam, the gas being maintained under pressure in solution in the liquid, said nozzle assembly comprising:
   a nozzle formed with a fluid conduit;
   means defining a turbulence zone communicating with said fluid conduit;
   channel means having at least two input ends and two outlet ends discharging into said turbulence zone;
   means communicating with a source of liquid/gas solution for conveying the liquid/gas solution to each of said input ends of said channel means, a separate stream of liquid/gas solution being formed at each of said input ends of said channel means, said separate streams of liquid/gas solution moving toward one another along said channel means and impacting together at said turbulence zone causing agitation of said liquid/gas solution within said fluid conduit, a pressure lower than the pressure required to maintain the gas completely in solution in the liquid but greater than atmospheric pressure being maintained within said fluid conduit while the agitated liquid/gas solution enters said fluid conduit so that the gas at least begins to leave solution to form the foam within said fluid conduit.

2. The nozzle assembly of claim 1 further including a turbulence plate having a forward surface communicating with said fluid conduit, and in which said channel means are formed in the forward face of said turbulence plate.

3. A nozzle assembly for forming a liquid/gas solution into a foam, the gas being maintained under pressure in solution in the liquid, said nozzle assembly comprising:
   a nozzle formed with a foaming chamber, said foaming chamber having a rearward end and a forward end terminating in a discharge orifice;
   a turbulence plate having a forward surface disposed at said rearward end of said forming chamber;
   channel means formed in said forward surface of said turbulence plate, said channel means having at least two input ends and a turbulence zone therebetween, said turbulence zone communicating with said rearward end of said forming chamber; and
   means communicating with a source of liquid/gas solution for conveying the liquid/gas solution to each of said input ends of said channel means, a separate stream of liquid/gas solution being formed at each of said input ends of said channel means, said separate streams of liquid/gas solution moving toward one another along said channel means and impacting together at said turbulence zone of said channel means causing agitation of said liquid/gas solution within said foaming chamber, a pressure lower than the pressure required to maintain the gas completely in solution in the liquid but greater than atmospheric pressure being maintained within said foaming chamber while the agitated liquid/gas solution enters the foaming chamber so that the gas at least begins to leave solution to form the foam prior to emission from said foaming chamber through said discharge orifice.

4. The nozzle assembly of claim 3 in which said discharge orifice and said channel means each have a flow resistance, said flow resistance of said discharge orifice being lower than said flow resistance of said channel means so as to create a back pressure within said chamber.

5. The nozzle assembly of claim 4 in which said back pressure is greater than atmospheric and less than the pressure required to maintain the gas in solution in the liquid.

6. The nozzle assembly of claim 3 in which said channel means comprises a notch formed in said front surface of said plate, said notch being discontinuous along a portion thereof, said discontinuous portion forming said turbulence zone of said notch.

7. The nozzle assembly of claim 3 in which said channel means comprises a notch having two input ends disposed approximately 180° apart.

8. The nozzle assembly of claim 3 in which said channel means forms two inlet passages, each of said inlet passages extending between one of said input ends of said channel means and said turbulence zone, said inlet passages being disposed in direct alignment with one another.

9. The nozzle assembly of claim 3 in which said channel means forms two inlet passages, each of said inlet passages extending between one of said input ends of said channel means and said turbulence zone, said inlet passages being disposed parallel to and offset from one another.

10. The nozzle assembly of claim 3 in which said plate is formed with an axial bore adapted to receive a plunger, said plunger being retractably engageable with said rearward end of said chamber to seal said input ends of said channel means.

11. The nozzle assembly of claim 3 in which said forward surface of said turbulence plate is planar.

12. The nozzle assembly of claim 3 in which said forward surface of said turbulence plate is frustoconical having a conical-shaped skirt tapering radially inwardly to a reduced diameter, generally planar surface.

13. The nozzle assembly of claim 12 in which said channel means forms two inlet passages, each of said inlet passages extending between one of said input ends of said channel means along said conical-shaped skirt and reduced diameter planar surface to said turbulence zone.

14. A nozzle for forming a liquid/gas solution into a foam, the gas being maintained under pressure in solution in the liquid, said nozzle assembly comprising:
a nozzle formed with a foaming chamber communicating with a discharge orifice, said discharge orifice having a flow resistance;
means defining a turbulence zone communicating with said foaming chamber;
channel means having at least two input ends and two outlet ends discharging into said turbulence zone, said channel means having a flow resistance;
means for conveying the liquid/gas solution to each of said input ends of said channel means, a separate stream of liquid/gas solution being formed at each of said input ends of said channel means, said separate streams of liquid/gas solution moving toward one another along said channel means and impacting together at said turbulence zone causing agitation of said liquid/gas solution within said foaming chamber;
said flow resistance of said discharge orifice being lower than said flow resistance of said channel means to create a back pressure within said foaming chamber while the agitated liquid/gas solution enters said foaming chamber so that a pressure greater than atmospheric but lower than the pressure required to maintain the gas completely in solution in the liquid is maintained within said foaming chamber, the gas in the liquid/gas solution at least beginning to leave solution within said foaming chamber to form the foam.

15. The nozzle assembly of claim 14 in which said flow resistance of said channel means is in the range of about 1.1 to 10 times greater than said flow resistance of said discharge orifice.

16. The nozzle assembly of claim 14 in which said flow resistance of said channel means is optimally in the range of about 1.4 to 5 times greater than said flow resistance of said discharge orifice.

17. A nozzle assembly for forming a liquid/gas solution into a foam, the gas being maintained under pressure in solution in the liquid, said nozzle assembly comprising:
a nozzle formed with a fluid conduit;
means communicating with a source of liquid/gas solution for conveying the liquid/gas solution into said fluid conduit;
means for agitating the liquid/gas solution within said fluid conduit, a pressure lower than the pressure required to maintain the gas completely in solution in the liquid but greater than atmospheric pressure being maintained within said fluid conduit while the liquid/gas solution enters said fluid conduit so that the gas at least begins to leave solution to form a foam within said fluid conduit.

18. The nozzle assembly of claim 17 in which said means for agitating the liquid/gas solution comprises means for separating the liquid/gas solution into at least two individual streams moving in opposite directions and then impacting said streams with one another within said fluid conduit.

19. The method of forming a liquid/gas solution into a foam, the gas being maintained in solution in the liquid, comprising the steps of:
flowing the liquid/gas solution through a nozzle assembly having a fluid conduit and a turbulence plate formed with a turbulence zone, said turbulence zone communicating with said fluid conduit;
dividing the liquid/gas solution into separate streams;
impacting said separate streams with one another within said turbulence zone to create agitation of the liquid/gas solution;
conveying the agitated liquid/gas solution into said fluid conduit;
maintaining while the agitated liquid/gas solution is conveyed into said fluid conduit a pressure within said fluid conduit which is lower than that required to maintain all of the gas in solution in the liquid but greater than atmospheric pressure so that at least part of the gas evolves from solution and becomes entrapped in the surrounding liquid to form the foam within said fluid conduit.

20. The method of forming a liquid/gas solution into a foam, the gas initially being maintained in solution in the liquid, comprising the steps of:
flowing the liquid/gas solution through a nozzle assembly having a foaming chamber terminating with a discharge orifice while maintaining said solution under sufficient pressure to maintain said gas in solution;
dividing said liquid/gas solution into two separate streams;
impacting said streams of liquid/gas solution with one another in a turbulence zone to create agitation of the liquid/gas solution;
conveying the agitated liquid/gas solution into said foaming chamber;
maintaining while the agitated liquid/gas solution is conveyed into said foaming chamber a pressure within said foaming chamber which is lower than that required to maintain all of the gas in solution in the liquid but greater than atmospheric pressure so that at least part of the gas evolves from solution and becomes entrapped in the surrounding liquid to form the foam within said fluid conduit.

* * * * *